United States Patent
Jurgenson

[11] Patent Number: 5,808,834
[45] Date of Patent: Sep. 15, 1998

[54] LAMINATED ADAPTER

[75] Inventor: Ryan A. Jurgenson, Hutchinson, Minn.

[73] Assignee: Hutchinson Technology Incorporated, Hutchinson, Minn.

[21] Appl. No.: 660,111

[22] Filed: Jun. 7, 1996

Related U.S. Application Data

[60] Provisional application No. 60/000,008 Jun. 8, 1995.
[51] Int. Cl.⁶ .............................. G11B 5/60; G11B 21/21
[52] U.S. Cl. ............................................................ 360/104
[58] Field of Search ..................................... 360/104, 103

[56] References Cited

U.S. PATENT DOCUMENTS

| | | |
|---|---|---|
| 4,337,536 | 6/1982 | Taylor . |
| 4,543,295 | 9/1985 | St.Clair et al. . |
| 4,616,279 | 10/1986 | Poorman . |
| 4,645,280 | 2/1987 | Gordon et al. . |
| 4,761,699 | 8/1988 | Ainslie et al. . |
| 4,789,914 | 12/1988 | Ainslie et al. . |
| 4,801,765 | 1/1989 | Moyer et al. . |
| 4,819,094 | 4/1989 | Oberg . |
| 4,827,376 | 5/1989 | Voss . |
| 4,884,155 | 11/1989 | Spash . |
| 4,991,045 | 2/1991 | Oberg . |
| 4,996,623 | 2/1991 | Erpelding et al. . |
| 5,001,583 | 3/1991 | Matsuzaki . |
| 5,052,105 | 10/1991 | Mische et al. . |
| 5,103,359 | 4/1992 | Marazzo . |
| 5,111,351 | 5/1992 | Hamilton . |
| 5,124,864 | 6/1992 | Matsuzaki . |
| 5,166,845 | 11/1992 | Thompson et al. . |
| 5,245,489 | 9/1993 | Kimura et al. . |
| 5,274,911 | 1/1994 | Toro . |
| 5,384,432 | 1/1995 | Noro et al. . |
| 5,391,842 | 2/1995 | Bennin et al. . |
| 5,392,179 | 2/1995 | Sendoda . |
| 5,490,027 | 2/1996 | Hamilton et al. . |
| 5,491,597 | 2/1996 | Bennin et al. ........................... 360/104 |
| 5,519,552 | 5/1996 | Kohira et al. . |
| 5,530,604 | 6/1996 | Pattanaik ................................ 360/104 |
| 5,597,496 | 1/1997 | Masaichi et al. ....................... 360/104 |

FOREIGN PATENT DOCUMENTS

| | | |
|---|---|---|
| 1329261 | 5/1994 | Canada . |
| 0 484 906 A2 | 5/1992 | European Pat. Off. . |
| 0 599 669 A2 | 6/1994 | European Pat. Off. . |
| 53-30310 | 3/1978 | Japan . |
| 53-74414 | 7/1978 | Japan . |
| 60-246015A | 12/1985 | Japan . |
| 4-134611 | 5/1992 | Japan . |
| 4-219618 | 8/1992 | Japan . |
| 5-182143 | 7/1993 | Japan . |
| WO 95/16261 | 6/1995 | WIPO . |

*Primary Examiner*—Robert S. Tupper
*Attorney, Agent, or Firm*—Faegre & Benson LLP

[57] ABSTRACT

A laminated adapter provides electrical interconnection between electrical bond pads on a vertical surface of a head slider with electrical trace interconnects adhesively bonded to a horizontal surface of the adapter, opposite to the surface to which the head slider is to be attached. Electrical connection from the electrical bond pads on a vertical face of the head slider to the electrical trace interconnects on the laminated adapter is provided by means such as electrically conductive welds. Electrical connection can be made from a horizontal surface of the assembled laminated adapter opposite to the head to electrical connection means on the surface of the head suspension assembly. The laminated adapter is particularly suitable for use with integrated electrical trace interconnects on a head suspension assembly.

20 Claims, 10 Drawing Sheets

LAMINATED ADAPTER

REFERENCE TO RELATED APPLICATION

This application claims the benefit of application Ser. No. 60/000,008, filed Jun. 8, 1995, and entitled "Laminated Adapter."

FIELD OF THE INVENTION

A laminated adapter according to this invention includes a head slider having electrical bond pads on a vertical surface thereof with electrical conductors adhesively bonded to a horizontal surface of the head slider, opposite to the surface to which the head is to be attached. Electrical connection from the electrical bond pads on the head slider to the electrical conductors on the laminated adapter is provided by means such as electrically conductive welds. Electrical connection from the assembled laminated adapter to electrical connection means on the surface of the head suspension assembly can then be made from the horizontal surface of the head slider opposite to the head. The laminated adapter is particularly suitable for electrical connection to trace interconnects on a head suspension assembly.

BACKGROUND OF THE INVENTION

Standard head suspension assemblies (HSAs) include, as component elements, a base plate, a load beam, a gimballing flexure and a head slider. The base plate is attached to a proximal end of the load beam and is configured for mounting the load beam to an actuator arm of a disk drive. The flexure is positioned at a distal end of the load beam. Mounted to the flexure is a head slider, which is flexibly supported in read/write orientation (flying attitude) with respect to an associated disk, so that it can move in response to imperfections in the disk while maintaining its desired orientation. The component elements may be separate pieces which are attached to each other, or two or more adjacent component elements may be constructed as a one-piece structure to which the remaining component elements are then attached.

The head slider is mounted to the gimballing flexure in a predetermined relationship or orientation to the disk surface. Conductors on the head slider must be electrically connected to conductors on the flexure during mounting and electrical connection must be continued by conductors along the length of the HSA to electrical circuitry at the actuator arm, in order to read and/or write information to and from the disk.

Previously, such mounting and electrical connection of the head slider to the gimballing flexure has been done by hand. Hand mounting is imprecise, time-consuming and expensive. Typically, two to five wires are bonded to bond pads on a vertical surface of the head slider, and the head slider is adhesively bonded to the HSA. The wires are formed into a service loop between the head slider and the HSA, and are then positioned and bonded on a pathway along the length of the HSA to the actuator arm. Tension on the service loop must be carefully controlled and the continual risk of damage to the delicate wires must be avoided. The industry demand for increased storage capacity along with smaller overall size, leads to requirements for more precise methods of mounting and electrical connection on increasingly smaller sized elements.

In efforts to meet these new industry demands, a self-contained electrical interconnect assembly has been developed for direct installation to the HSA. As described in commonly assigned U. S. Pat. No. 5,391,842, issued Feb. 21, 1995, the interconnect is a film carrier strip to which conducting elements are positioned and bonded, according to a route pre-patterned on the carrier strip. The HSA is then positioned and laminate bonded within the carrier strip framework at bonding sites. Upon completion of the HSA, the carrier strip is excised.

Laminate structures have also been proposed in connection with construction of electrical connections for other HSA structures. Electrically conductive laminate HSA structures are fabricated from a laminate of at least three sheets. The first layer is a metal spring material, the second layer is an electrically insulating material, usually an adhesive, and the third layer is an electrically conductive material. The first layer is formed into a spring or load beam element or other HSA component element. The third layer is formed into at least one trace, which is a flat, substrateless conductive element. The second layer is formed into areas of contact between the parts of the first and third layer, in order to electrically isolate the first and third layers from each other. After the layers have been laminated together, the traces are electrically coupled to other connectors carrying signals from the head slider to circuitry at the actuator arm and the laminate is attached to other elements of the HSA. The procedures for forming the various layers, as well as for assembling them, are readily and reliably automatable.

There still exists a need for a head slider on which electrical conductors can dependably and automatably be routed in such a manner that the electrical conductors can be readily and reliably attached to other conductors routed along the HSA.

SUMMARY OF THE INVENTION

A laminated adapter in accordance with the present invention interconnects a head slider to a flexure of a suspension assembly and electrically couples the head assembly to the suspension assembly. One embodiment of the laminated adapter comprises three or more layers. The material of the first layer of the laminated adapter is a planar spring material, which has a surface for receiving a head slider to be bonded thereto. The material of the second layer of the laminated adapter is a dielectric adhesive, for bonding the first layer to a third layer and electrically isolating them. The material of the third layer of the laminated adapter is an electrically conductive material. The third layer comprises at least one electrical trace for providing electrical interconnection between an electrical terminal on the head slider and electrical interconnect circuitry on the flexure of the suspension assembly.

This invention also comprises a method for manufacturing a laminated adapter for interconnecting a head slider to a flexure of a suspension assembly and for electrically coupling the head assembly to the suspension assembly. One embodiment of this method comprises the following steps. A layer of a planar spring material is provided, which has a surface for receiving a head slider to be bonded thereto. A layer is also provided of a single-layer thin planar electrically conductive material. A layer is provided of an adhesive dielectric bonding material which is interposed between and bonded to the layers of spring material and of conductive material. The resulting laminate is etched to manufacture at least one electrical trace interconnect in the conductive layer.

The laminated adapter may be assembled into a suspension assembly. In the suspension assembly the number of traces typically provided is equal to the number of electrical terminals on the head slider with each trace interconnecting an electrical terminal on the head slider to electrically couple it to further electrical interconnect circuitry on the flexure of the suspension assembly.

DETAILED DESCRIPTION OF THE INVENTION

Figure 1:
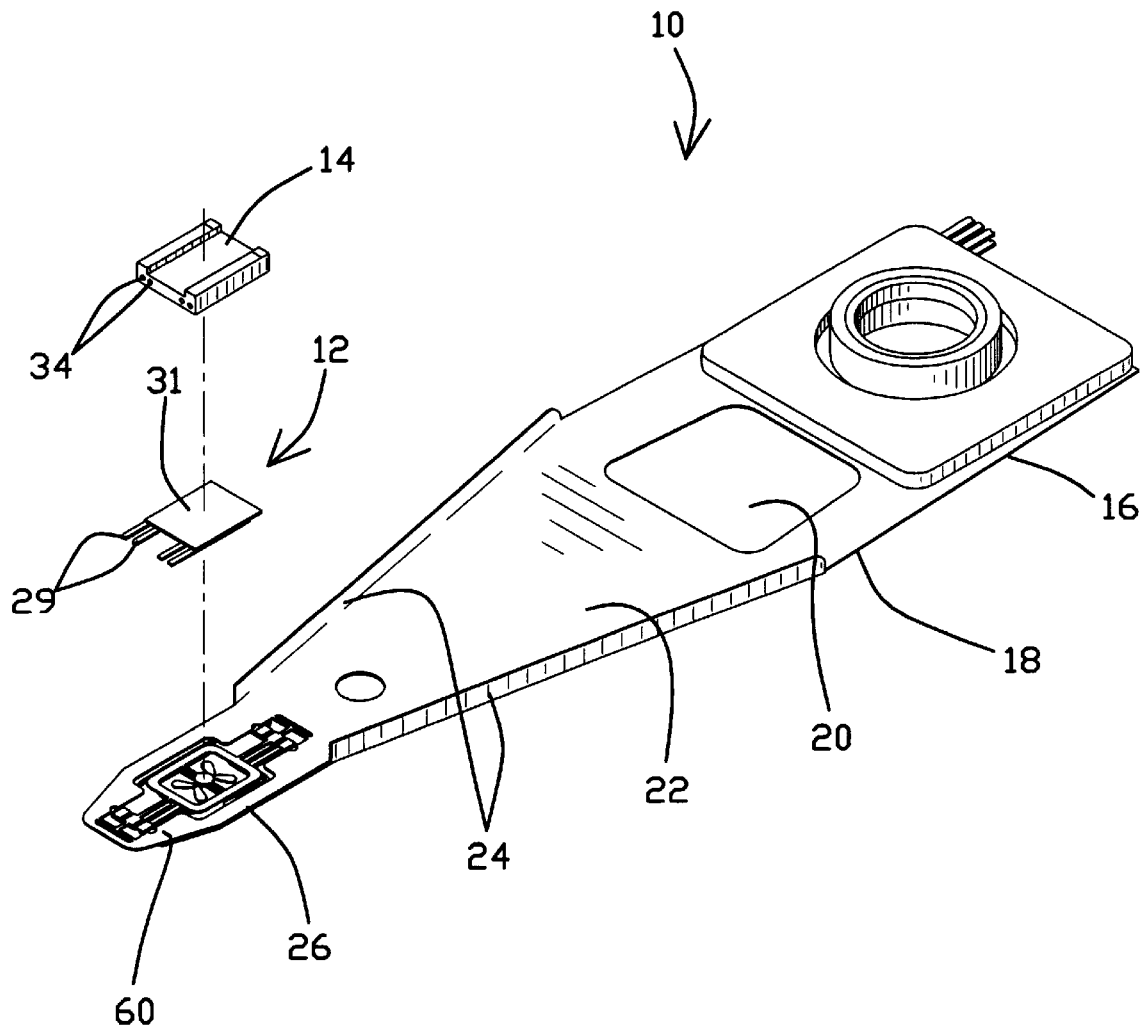
FIG. 1 shows a suspension assembly with a first embodiment of a laminated adapter according to this invention and shown with a head slider and the adapter exploded away from the suspension assembly.

Illustrated in exploded form in FIG. 1, is a laminated adapter 12, according to this invention, and a head slider 14 positioned in suitable relationship for connection to a suspension assembly 10. The suspension assembly 10 is a one-piece structure which includes a rigid base region 16, a spring region 18, a load beam region 22 and a gimbal region 26. The rigid region 16 is adapted and designed for attachment to an actuator arm (not shown). Distal of the rigid region 16, the spring region 18 is provided with a cut-out 20 to increase its flexibility in that region. Distal of the spring region 18, the load beam region 22 is configured with perimeter rails 24 to increase its rigidity in load beam region 22. Distal of the load beam region 18, the head suspension assembly terminates in a gimbal region 26. In other embodiments of the invention, the gimbal region may be a separate piece, welded to load beam 22.

Figure 2:
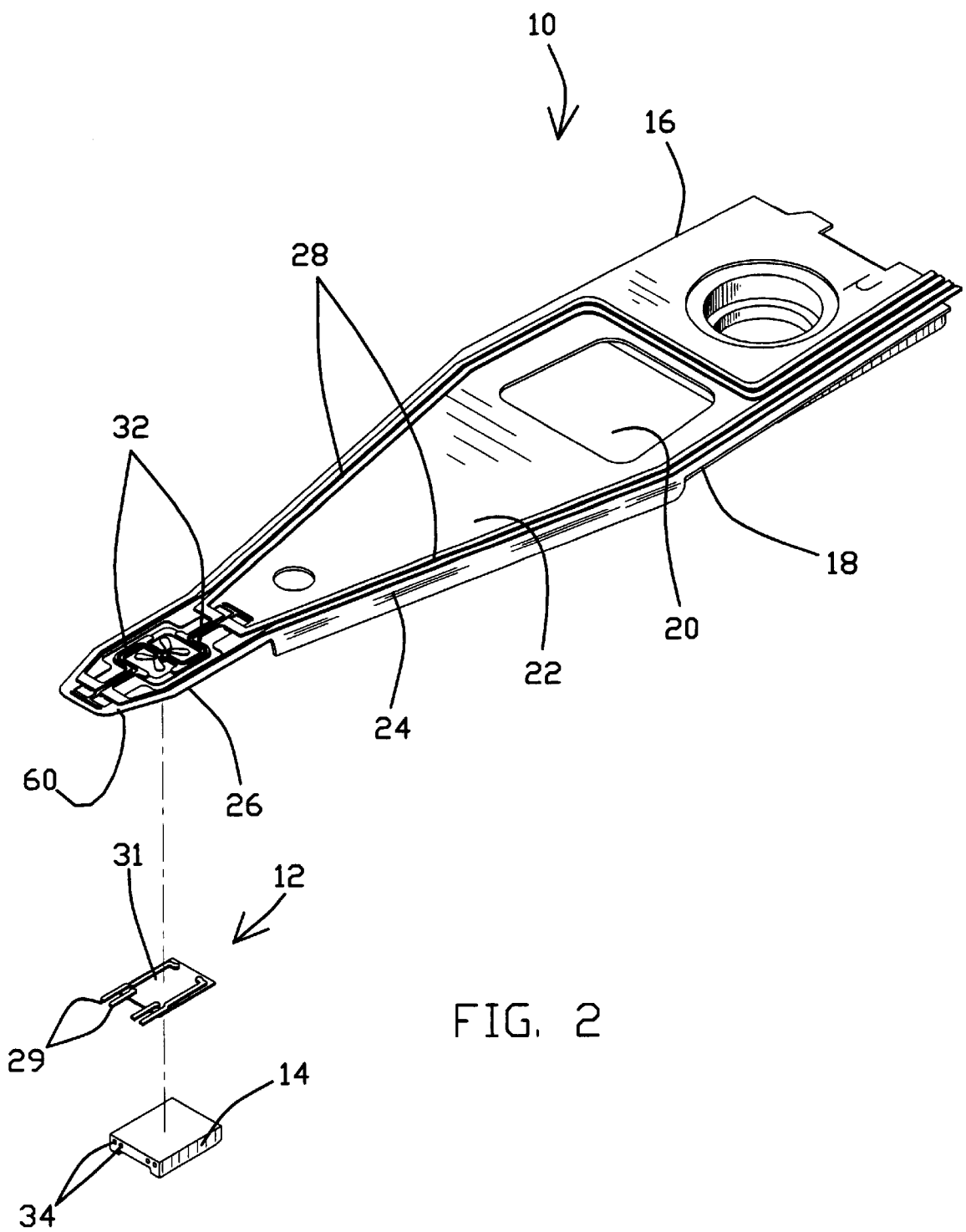
FIG. 2 shows the same components as in FIG. 1, viewed from the opposite side.

FIG. 2 shows the suspension assembly 10 of FIG. 1, with its associated laminated adapter 12 and the head slider 14, as seen from the opposite horizontal surface. In FIG. 2 are visible the conductors 28 patterned onto the suspension 10, which are adapted for connection to proximal ends of the trace interconnects 29 on the laminated adapter 12 at the gimbal region 26 and which extend along perimeter edges of the load beam region 22 to the base region 16, from which they then are adapted to connect to external circuitry (not shown). The suspension trace conductors 28 thus provide electrical interconnection between the external circuitry and the head slider 14 through the trace interconnects 29 which are patterned on the laminated adapter 12.

Figure 3:
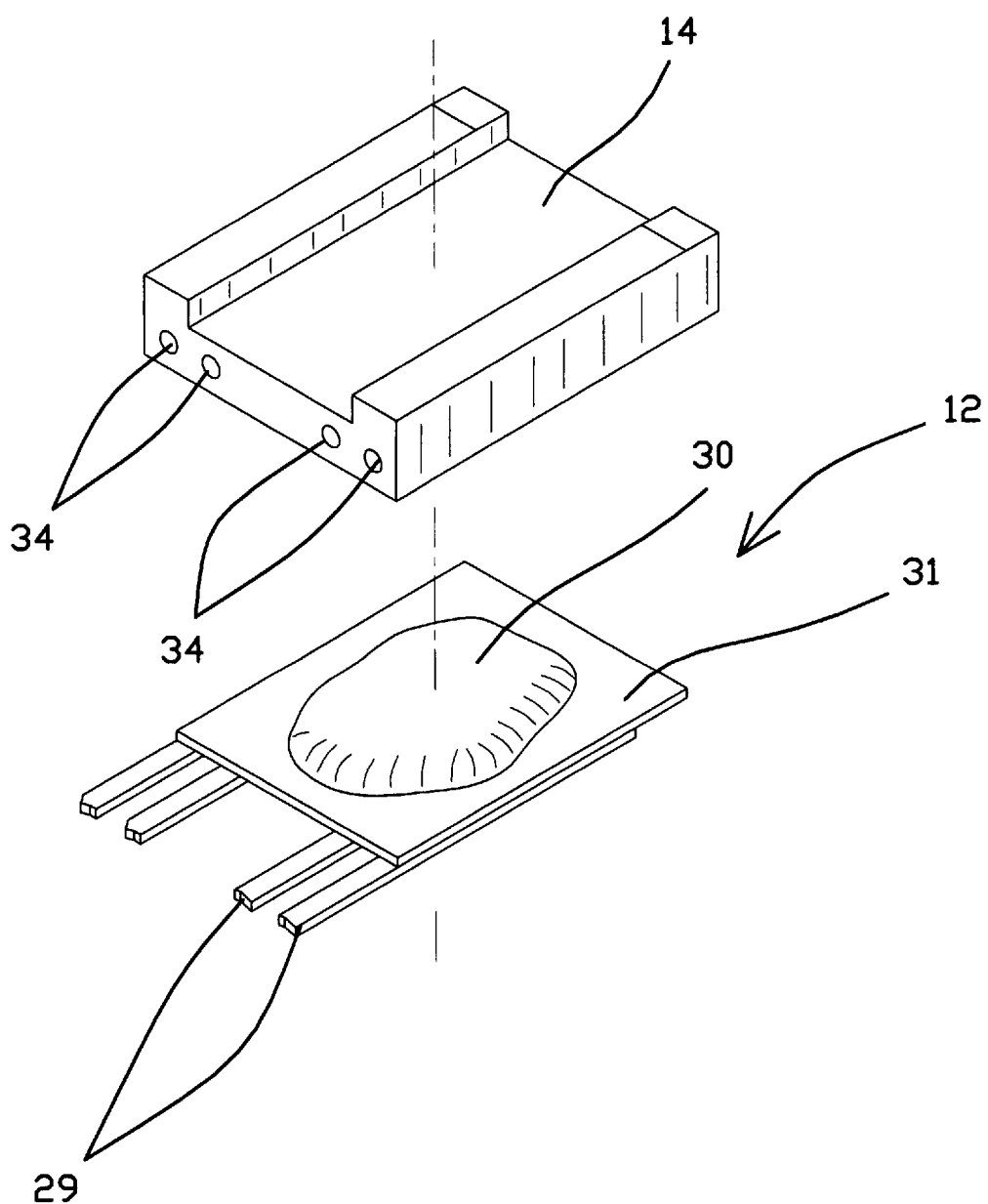
FIG. 3 shows the laminated adapter of FIG. 1, with the head slider exploded away from the adapter and with adhesive in position for bonding the slider and adapter together.
Figure 4:
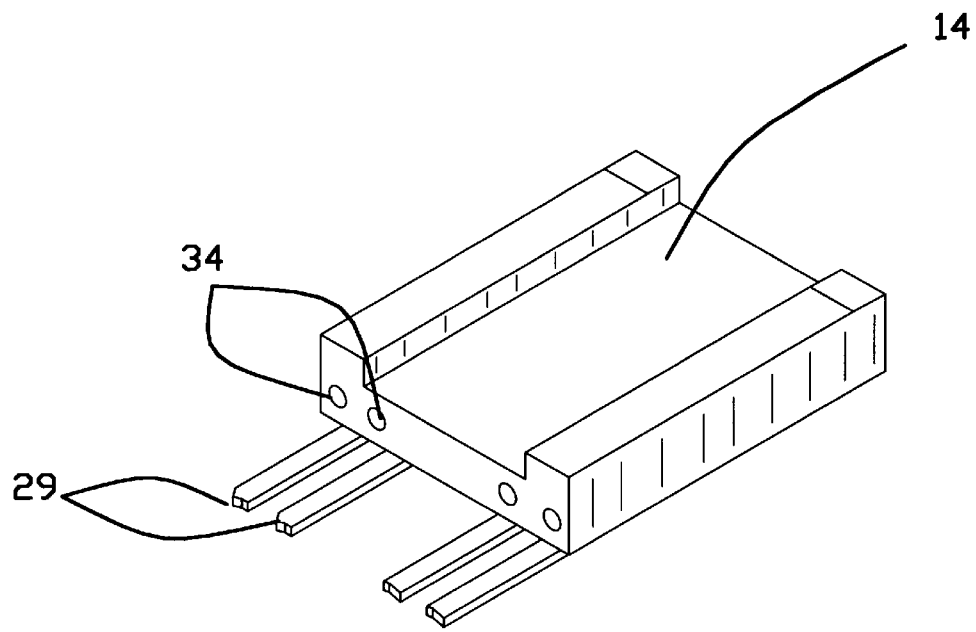
FIG. 4 shows the components of FIG. 3 bonded together.

In FIG. 3, the laminated adapter 12 of FIGS. 1 and 2 is shown enlarged, with the head slider 14 exploded away from the adapter 12 and with adhesive 30 in position for bonding the head slider 14 and adapter 12 together. In FIG. 4, the head slider 14 and the adapter 12 are shown bonded together.

Figure 5:
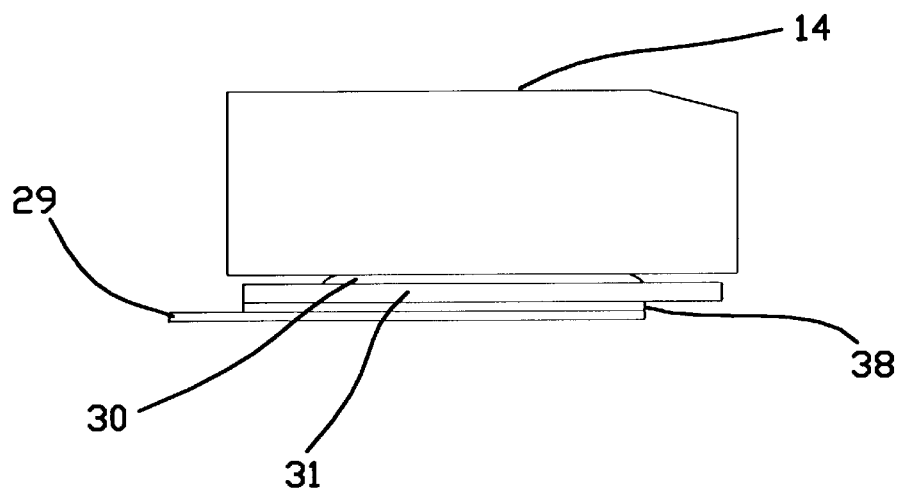
FIG. 5 is a profile view of FIG. 4.

FIG. 5 is a profile of FIG. 4 in which can be seen the elements which form the adapter 12 and the head slider 14. The elements which form the adapter 12 are etched from a laminate of three layers, the first layer from the top or slider side is the base layer 31. The second, intermediate layer is a dielectric layer 38, which may also be a structural dielectric adhesive, and the third layer is a conductive layer. The laminate has been etched to manufacture the trace interconnects 29 and remove unnecessary dielectric.

Figure 6:
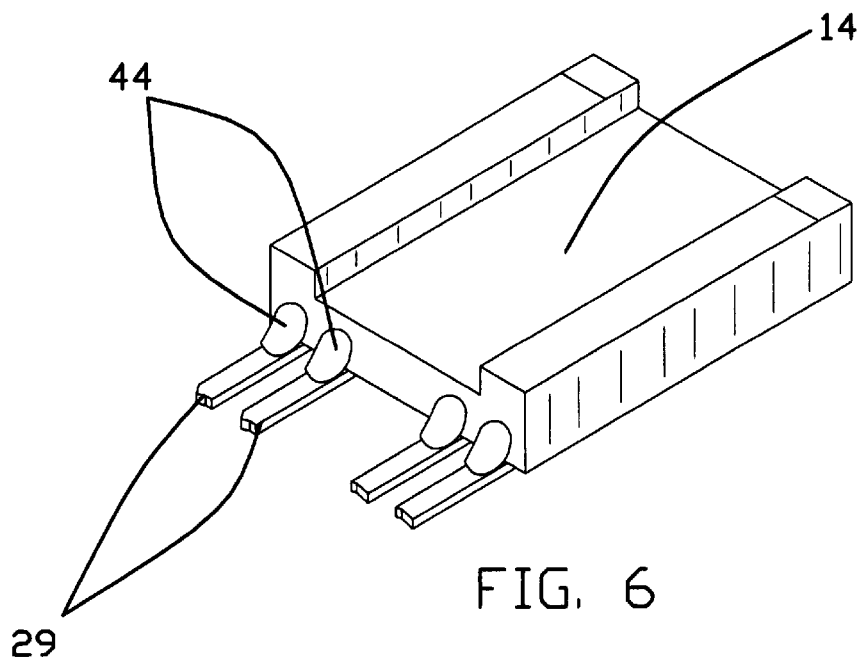
FIG. 6 shows the laminated adapter with electrical connection made from the electrical bond pads on a vertical surface of the head slider to the traces on the adapter.
Figure 7:
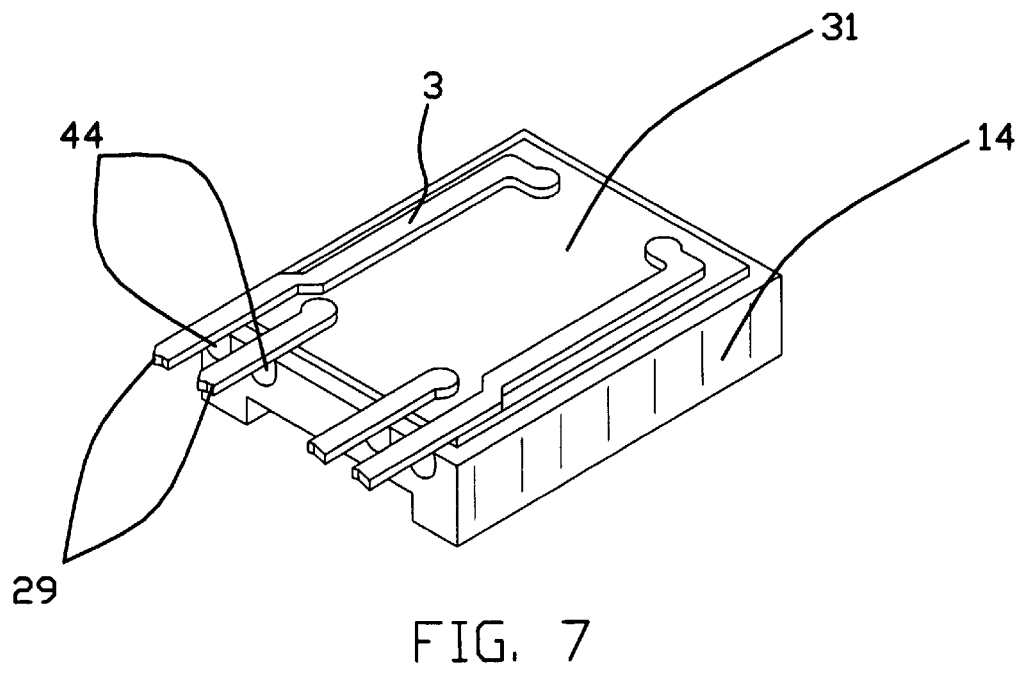
FIG. 7 shows the laminated adapter of FIG. 6, from the opposite surface.

In FIG. 6, the head slider 14 and the adapter 12 are shown with electrically conductive welds or solder joints 44 conductively coupling the electrical terminals of bond pads 34 on the vertical face of the head slider 14 and the trace interconnects 29 on the adapter 12. FIG. 7 shows the adapter 12 and the head slider 14 of FIG. 6 as seen from the opposite horizontal surface.

The three layers of the laminated adapter 12, perhaps best seen in FIG. 5, are manufactured from a three layer laminate sheet where the first layer is the base layer 31, the second layer is a dielectric layer 38, and the third layer is a conductive layer in which trace interconnects 29 remain after etching. The third layer comprises at least one electrical trace 29 which is electrically coupled to terminals 34 on the head slider 14 by means of electrically conductive welds 44. The second layer, a dielectric layer 38, may include an adhesive for bonding the first and third layers to each other, or the dielectric layer 38 may itself be a suitable bonding adhesive. The first layer is a base layer 31 of planar sheet material for providing a surface for bonding to a flat horizontal face of the head slider 14.

Figure 13:
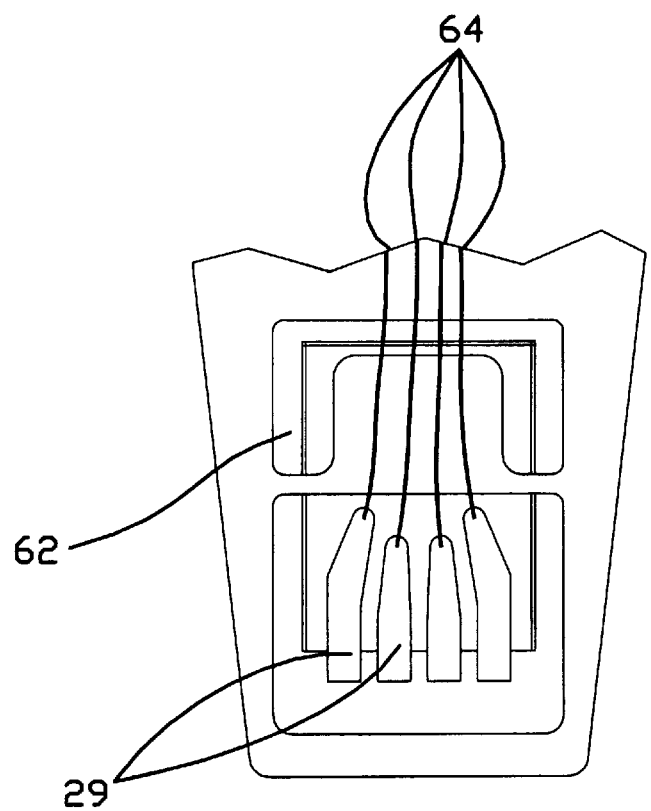
FIG. 13 shows the alternative conductor format of FIG. 12 adapted for attachment to wires to be conducted down the center of a head suspension assembly.

The layer of trace interconnects 29 is an electrically conductive material, such as a high performance copper alloy, preferably a copper-beryllium alloy because of its superior mechanical and its electrical characteristics. Preferred forms of the trace interconnects, as seen in FIGS. 7 and 13, each may typically include two pairs of trace interconnects 29 for providing electrical interconnection between the corresponding electrical terminals or bond pads 34, on a vertical face of the head slider 14, and the conductors 28 along the suspension assembly 10. Electrical connection between the trace interconnects 29 and the electrical terminals or bond pads 34 can be made by electrically conductive solder joints or welds 44. For conventional magnetic heads two trace interconnects 29 may typically complete a single read/write circuit, which can operate for both read and write functions. The number and arrangement of the trace interconnects 29 may vary if, for example, magnetoresistive heads are used. The configuration of the suspension assembly 10 may also be varied without obviating the need for the adapter disclosed herein.

Once trace interconnects 29 have been configured, an additional thin coating 3 of a dielectric material may be applied to electrically isolate the exposed face of the trace interconnects 29 from contact with the spring material of the flexure 26. The dielectric isolation coating 3 may be spray, dip, roll, or print coated to the trace interconnects 29. It may be applied to the entire layer of the trace interconnects 29, or only to selected locations. Preferably, an adhesive that acts as a dielectric, such as 3M's spray-applied EC2290 epoxy, may be used as the dielectric to eliminate a manufacturing step and reduce the overall mass of the laminated adapter 12. If desired, a corrosion protective coating (not shown) may be applied to the laminated adapter 12 and particularly the conductive traces 29. The dielectric coating can also be used as a corrosion inhibitor and applied to either or both of the metal surfaces.

Figure 8:
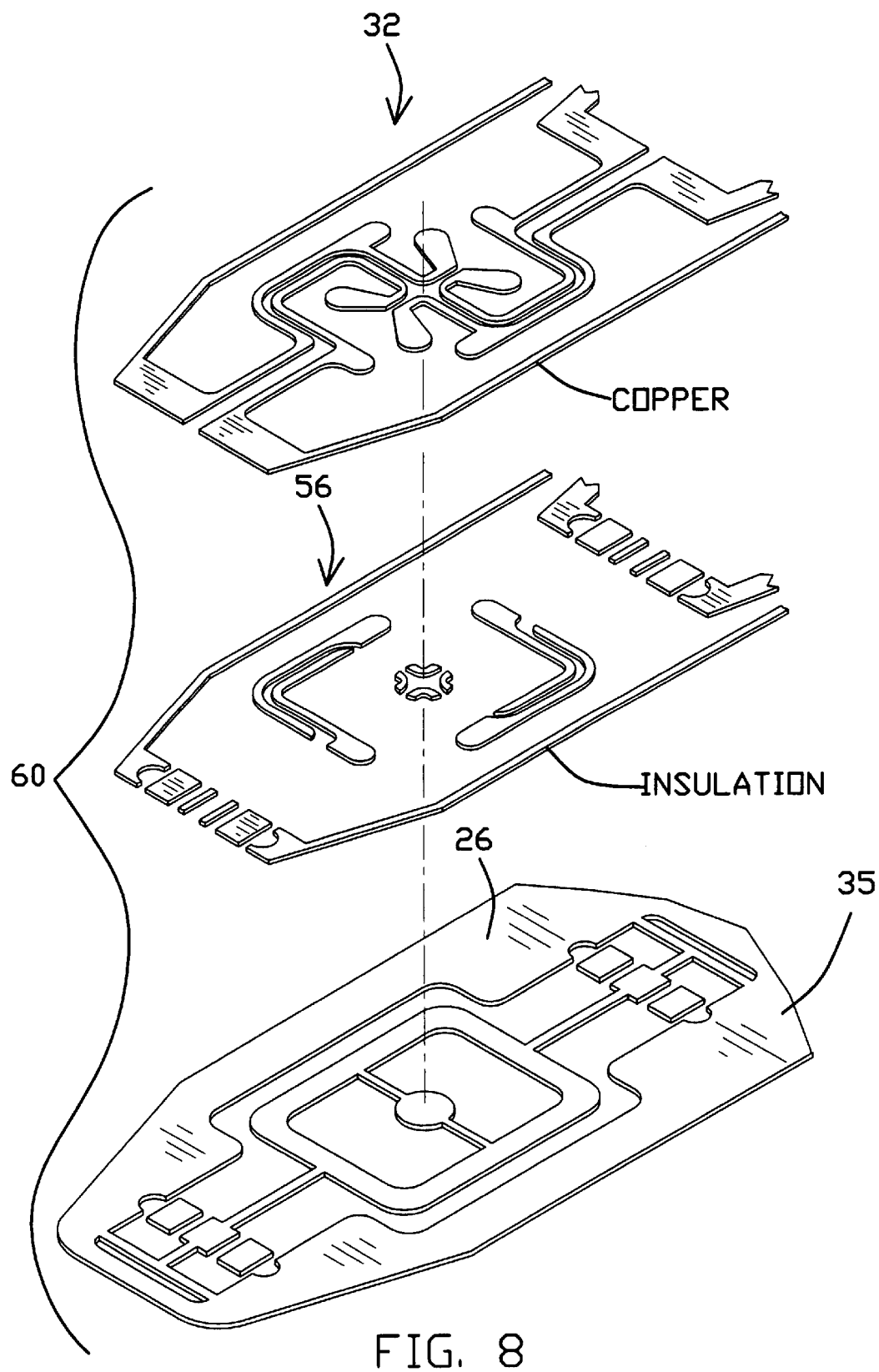
FIG. 8 shows in detailed exploded form the component layers of the gimbal assembly of FIGS. 1 and 2.

In FIG. 8 are shown, in exploded form, the component layers of the gimbal region 26 of FIGS. 1 and 2.

Figure 9:
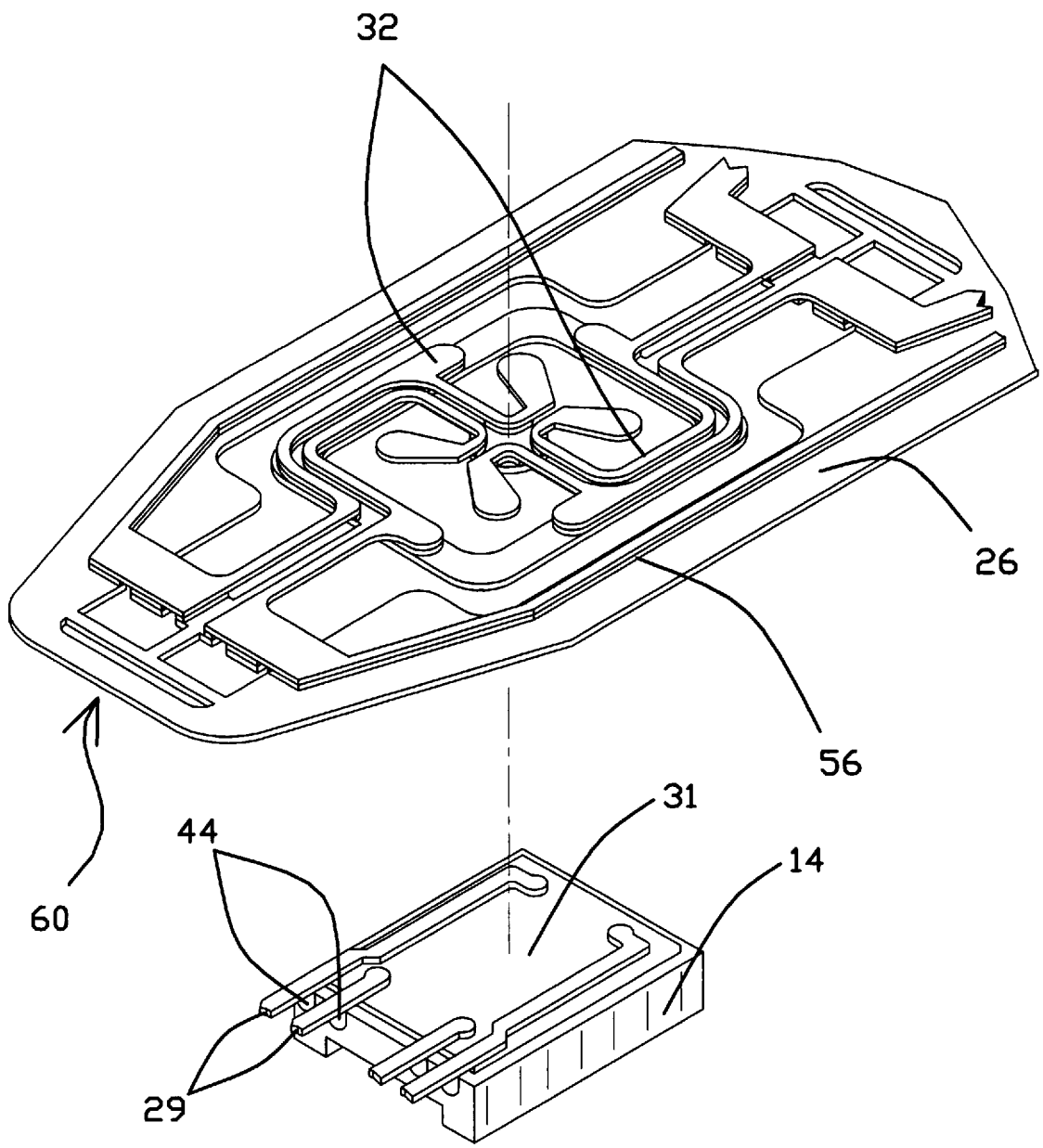
FIG. 9 shows in exploded form the gimbal assembly of FIG. 8 with the laminated adapter of this invention in alignment for assembly, so that electrical connection between the gimbal assembly and the laminated adapter is made between horizontal surfaces.

FIG. 9 shows in exploded form the component elements of FIG. 8 as assembled, with the laminated adapter 12 of this invention positioned in alignment for assembly, so that electrical connection between the gimbal region 26 and the laminated adapter 12 may be made between aligned horizontal surfaces.

Figure 10:
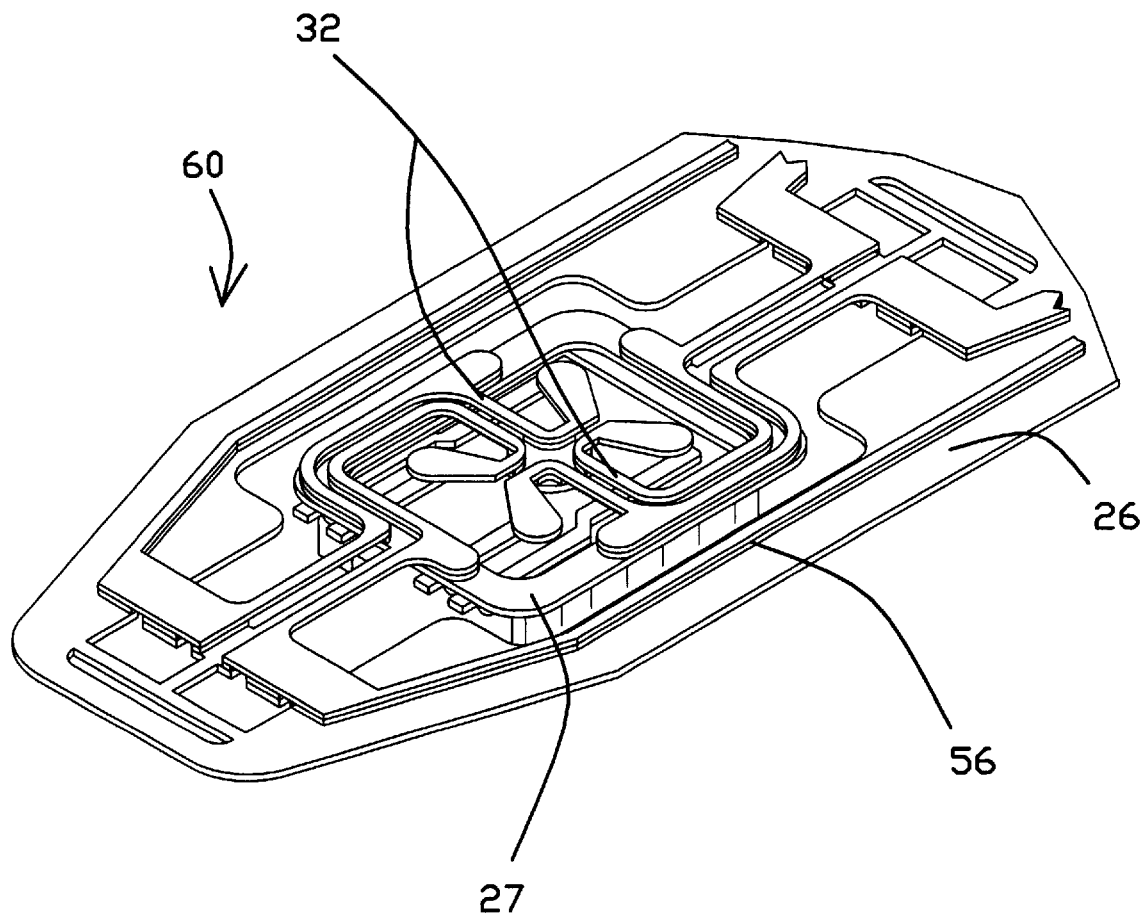
FIG. 10 shows the component elements of FIG. 9 as assembled.

FIG. 10 shows the component elements of FIG. 9 as assembled. The projecting tabs or tangs of trace interconnects 29 in this embodiment are typically coated with dielectric material to prevent shorting of the conductive traces to the gimbal ring 27 or other structure. In other embodiments of the invention, the relative sizes of the slider and gimbal region may be adjusted so that the entirety of the slider is free for gimbal action within the gimbal ring 27.

As perhaps best seen in FIG. 8, the three layers of the gimbal assembly 60 comprise a layer which contains the electrical interconnect circuitry 32, a dielectric layer 56, and a gimbal region 26 of the head suspension assembly 10. The interconnect circuitry 32 is comprised of at least one electrical trace interconnect each of which is adapted for electrical coupling to each electrical trace interconnect 29 of the laminated adapter 12. As has been described herein above, each electrical trace interconnect 29 of the laminated adapter 12 is also electrically coupled to an electrical terminal or bond pad 34 on a vertical face of the head slider 14 by means of electrically conductive welds 44 or other suitable means. The proximal ends of the electrical trace interconnects of the electrical interconnect circuitry 32 are extended as conductors 28 which extend along the length of the suspension assembly 10. Preferably conductors 28 are also electrical trace conductors manufactured in one piece with the electrical trace interconnects of the electrical interconnect circuitry 32 of the gimbal assembly 60. The dielectric layer 56 may include an adhesive for bonding the other two layers to each other, or the dielectric layer 56 may itself be a bonding adhesive.

The gimbal assembly support layer 26 in the embodiment shown is a planar sheet of material. As can be better seen in FIGS. 1 and 2, in the embodiment shown, the base layer 26 is the gimbal region 26 of a one-piece structure which also includes the rigid region 16, spring region 18 and load beam region 22.

The trace interconnect layer of the electrical interconnect circuitry 32 of the gimbal assembly 60 is a sheet constructed of an electrically conductive material, such as a high performance copper alloy, preferably a copper-beryllium alloy. One preferred format of the gimbal trace interconnects of the electrical interconnect circuitry 32 for the gimbal assembly 60 are shown in FIGS. 8–10. It includes trace interconnects for the electrical interconnect circuitry 32 for providing electrical interconnection between the trace interconnects 29 on the laminated adapter 12 and the conductors 28 along the suspension assembly 10. Preferably, the conductors 28 along the remainder of the suspension assembly are also integral electrical trace interconnects, manufactured in one piece with the trace interconnects for the electrical interconnect circuitry 32 of the gimbal assembly 60. The number and arrangement of the trace interconnects of the gimbal electrical interconnect circuitry 32 will vary.

Figure 11:
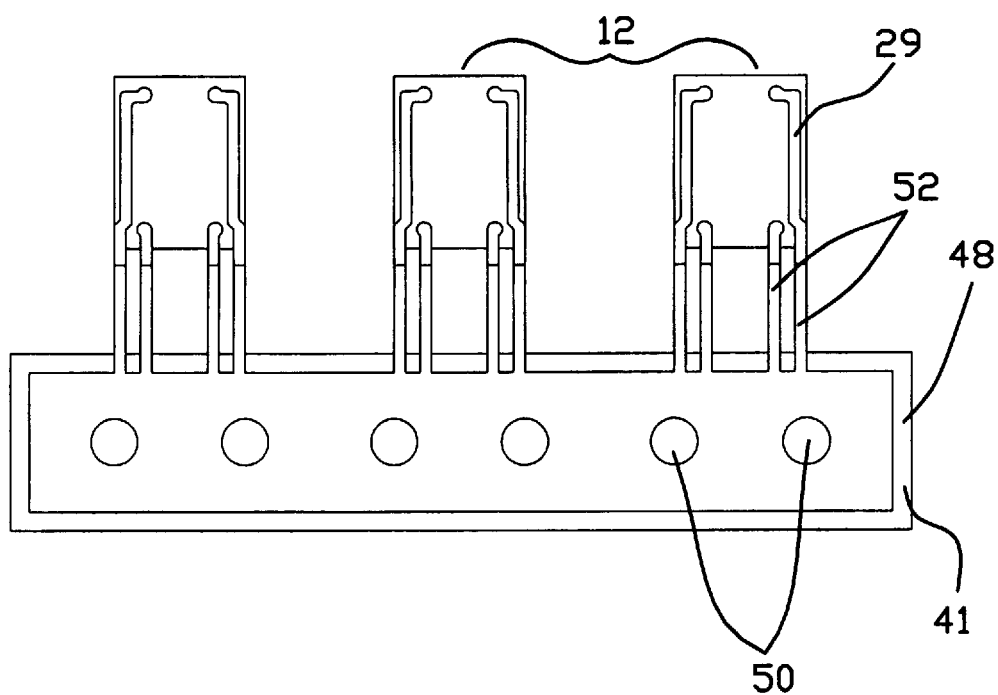
FIG. 11 shows laminated adapters of this invention in a carrier strip format ready for attachment to the sliders.

As illustrated by FIG. 11, several laminated adapters 12 may be manufactured simultaneously by etching them from a 3 ply laminate sheet to manufacture a support brace or carrier strip 48 that further improves the ease of handling and resistance to deformation of the trace interconnects 29. The carrier strip 48 provides a carrier and support element, preferably including both the spring material and conductive sheets, for alignment and fabrication of suspensions from the laminated adapter 12. The carrier strip 48 serves as a protective chassis, not only for the trace interconnects 29 and adapter, but also for the head slider 14 which may be attached thereto prior to removal of the interconnect adapter from carrier strip 48. It may also be dielectrically coated.

Carrier strip 48 includes a planar border 41 that may be 0-shaped (to support the laminated adapter 12 on four sides), C-shaped (to support the laminated adapter 12 on three sides), L-shaped (to support the laminated adapter 12 on two sides) or even I-shaped (to support the laminated adapter 12 on one side), as illustrated in FIG. 11. The carrier strip 48 also has tooling registration holes 50 and detachable support tabs 52 connecting the trace interconnects 29 thereto.

The carrier strip 48 does not interfere with mounting the trace interconnects 29 to the head slider 14 or to the conductors 28 along the suspension assembly 10. Once the laminated adapter 12 is attached to the head slider 14, carrier strip 48 can serve as a carrier element for the head slider 14 and laminated adapter 12 as a single unit. When no longer needed, the carrier strip 48 can be excised at the support tabs 52.

Figure 12:
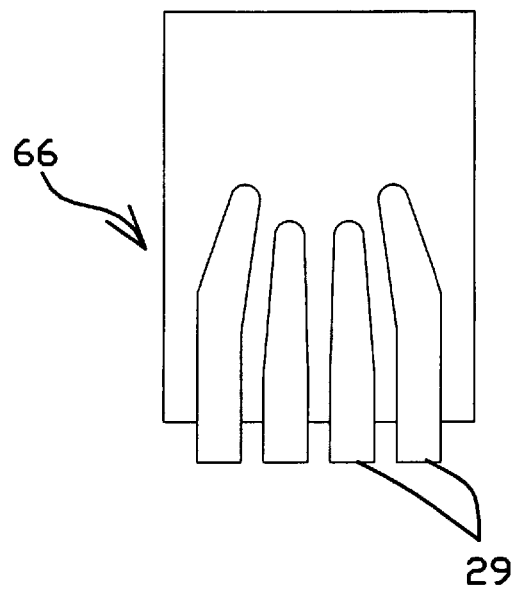
FIG. 12 shows an alternative conductor format for the adapter of this invention.

FIGS. 12 and 13 illustrate a conductor format 60 for an alternative laminated adapter 62 of the present invention. FIG. 13 shows the alternative conductor format adapted for attachment to wire conductors 64 to be routed down the center of a head suspension assembly 10 that does not incorporate integral or patterned trace interconnect conductors on the surface of the suspension.

What is claimed is:

1. A laminated adapter for interconnecting a head slider to a flexure of a suspension assembly and for electrically coupling the head slider to electrical interconnect circuitry on the suspension assembly comprising:

a layer of a planar spring material, having a surface for receiving the head slider to be bonded thereto;

a layer of an electrically conductive material, comprising at least one electrical trace each of which is constructed and arranged for providing electrical coupling between an electrical terminal on the head slider and the electrical interconnect circuitry on the suspension assembly; and a layer of a dielectric material, for electrically isolating the planar spring material from the electrically conductive material.

2. A laminated adapter according to claim 1, wherein the planar spring material is stainless steel.

3. A laminated adapter according to claim 1, wherein the dielectric material is a structural dielectric adhesive.

4. A laminated adapter according to claim 1, wherein the electrically conductive material is copper or beryllium-copper alloy.

5. In a head suspension assembly for positioning a head slider assembly over a rotatable data storage device and for electrically coupling the head slider assembly to control electronics, the head suspension assembly comprising:

a spring structure having a rigid region at a proximal end, a spring region distally adjacent to the rigid region, a load beam region distally adjacent to the spring region and a gimbal region distally adjacent to the load beam region, the spring structure provided with at least one electrical conductor along a length thereof from the rigid region to the distal gimbal region;

a head slider assembly including a transducer having at least one electrical terminal thereon; and a laminated adapter interconnected between the head slider assembly and the distal gimbal region of the load beam and for providing electrical connection between the electrical terminals on the head slider assembly to the electrical conductor at the distal gimbal region of the load beam suspension assembly, the laminated adapter comprising:

a first layer of a planar spring material having a surface, the head slider assembly bonded to the surface of the first layer of planar spring material;

a second layer of a dielectric, for electrically isolating the first layer of the laminated adapter from a third layer; and a third layer of an electrically conductive material, comprising at least one electrical trace interconnected between the electrical terminal of the transducer and the electrical conductor at the distal end region of the load beam.

6. A head suspension assembly according to claim 5, wherein the planar spring material of the laminated adapter is stainless steel.

7. A head suspension assembly according to claim 5, wherein the dielectric material of the laminated adapter is a structural dielectric adhesive.

8. A head suspension assembly according to claim 5, wherein the electrically conductive material of the laminated adapter is copper or beryllium-copper alloy.

9. A head suspension assembly according to claim 5, further comprising an adhesive on the surface of the first layer of the laminated adapter, the adhesive bonding the laminated adapter to the head slider assembly.

10. A head suspension assembly according to claim 5, further comprising an electrically conductive solder joint between each electrical terminal on a side edge of the transducer and each corresponding electrical trace on the laminated adapter.

11. A multi-layer laminated adapter for interconnecting a head slider to a flexure of a suspension assembly and for electrically coupling a head slider to electrical interconnect circuitry on a suspension assembly comprising a first layer of base material, a third layer of an electrically conductive material, the third layer having at least one electrical trace which is constructed and arranged for providing electrical coupling between an electrical terminal on a head slider and electrical interconnect circuitry on a suspension assembly, and a second layer of material between the first layer of base material and the third layer of electrically conductive material, wherein the laminated adapter is configured to be bonded to a flexure of a head suspension assembly and to a head slider to provide mechanical support for a heat slider, and wherein the electrical trace is configured to provide electrical interconnection between an electrical terminal on a head slider and circuitry on a head suspension.

12. A multi-layer laminated adapter according to claim 11, wherein the electrically conductive material is copper or beryllium-copper alloy.

13. A multi-layer laminated adapter according to claim 11 in combination with a head slider, the laminated adapter further comprising an adhesive between the first layer of base material and the head slider, the adhesive bonding the laminated adapter to the heat slider.

14. A multi-layer laminated adapter according to claim 11, wherein the at least one electrical trace is interconnected to a carrier strip.

15. A laminated adapter and head slider assembly for use with a head suspension having at least one integrated conductor extending along the suspension and terminating in at least one bond pad at a gimbal region of the head suspension, the laminated adapter comprising:

a substrate having a first surface and a second surface opposite the first surface;

a head slider mounted to the first surface of the substrate, the head slider having at least one electrical terminal on a surface of the head slider;

at least one electrical conductor electrically interconnected with the at least one electrical terminal of the head slider and constructed and arranged for electrical and mechanical interconnection with the at least one bond pad of the head suspension for supporting the laminated adapter and the head slider and for providing electrical coupling between the at least one electrical terminal on the head slider and the integrated conductor on the suspension; and an intermediary layer of material between the second surface of the substrate and the electrical conductor for electrically isolating the electrical conductor from the substrate.

16. The laminated adapter of claim 15, wherein the intermediary layer is a layer of dielectric material on the second surface of the substrate and in contact with at least one electrical conductor.

17. The laminated adapter of claim 16, wherein the dielectric material is adhesive used to attach the at least one electrical conductor to the substrate.

18. The laminated adapter of claim 15, further comprising a plurality of electrical conductors isolated from the substrate by the intermediary layer, the plurality of conductors configured to engage a plurality of bond pads of the head suspension.

19. The laminated adapter of claim 15, wherein the electrical terminals of the head slider are on a side surface of the head slider.

20. A head suspension assembly of the type having a head suspension and at least one integrated conductive lead extending along the head suspension and terminating in a bond pad at a gimbal region of the head suspension, the head suspension assembly including the laminated adapter of claim 17 interconnected to the bond pad of the at least one integrated conductive lead to provide electrical and mechanical connection between the head slider and the integrated conductive lead.

* * * * *

UNITED STATES PATENT AND TRADEMARK OFFICE
CERTIFICATE OF CORRECTION

PATENT NO. : 5,808,834
DATED : September 15, 1998
INVENTOR(S) : Jurgenson

It is certified that error appears in the above-identified patent and that said Letters Patent is hereby corrected as shown below:

Column 7, line 61, delete "heat" and insert therefor --head--.

Column 8, line 10, delete "heat" and insert therefor --head--.

Column 8, line 57, delete "17" and insert therefor --15--.

Signed and Sealed this

Ninth Day of March, 1999

Attest:

Q. TODD DICKINSON

Attesting Officer

Acting Commissioner of Patents and Trademarks